United States Patent
Won

(10) Patent No.: US 12,248,069 B2
(45) Date of Patent: Mar. 11, 2025

(54) VEHICLE DRIVING CONTROL SYSTEM AND METHOD USING SENSOR FUSION TECHNOLOGY

(71) Applicants: HYUNDAI MOTOR COMPANY, Seoul (KR); KIA CORPORATION, Seoul (KR)

(72) Inventor: Sang Bok Won, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 190 days.

(21) Appl. No.: 18/071,193

(22) Filed: Nov. 29, 2022

(65) Prior Publication Data
US 2023/0258805 A1 Aug. 17, 2023

(30) Foreign Application Priority Data
Feb. 11, 2022 (KR) .................. 10-2022-0018012

(51) Int. Cl.
*G01S 17/86* (2020.01)
*B60W 40/02* (2006.01)
(Continued)

(52) U.S. Cl.
CPC ............. *G01S 17/86* (2020.01); *B60W 40/02* (2013.01); *G01S 13/865* (2013.01);
(Continued)

(58) Field of Classification Search
CPC ........ G01S 17/86; G01S 17/89; G01S 17/931; G01S 13/865; G01S 13/867; G01S 13/89;
(Continued)

(56) References Cited

U.S. PATENT DOCUMENTS

| 9,530,062 B2 | 12/2016 | Nguyen et al. |
| 2017/0301239 A1 | 10/2017 | Lee et al. |

(Continued)

FOREIGN PATENT DOCUMENTS

| JP | 2005-228136 A | 8/2005 |
| JP | 2019-081393 A | 5/2019 |

(Continued)

OTHER PUBLICATIONS

Kocić et al.; Sensors and Sensor Fusion in Autonomous Vehicles; 26th Telecommunications forum TELFOR 2018; Serbia, Belgrade, Nov. 20-21, 2018. (Year: 2018).*

(Continued)

*Primary Examiner* — Michael J Zanelli
(74) *Attorney, Agent, or Firm* — Morgan, Lewis & Bockius LLP

(57) ABSTRACT

A vehicle driving control system includes: an input device configured to receive LiDAR data and camera and/or radar data obtained for a region of interest around a host vehicle; a microprocessor configured to obtain information for localization on objects of interest by executing a first process for the LiDAR data and the camera and/or radar data and obtain information for driving path on the objects by executing a second process for the LiDAR data and the camera and/or radar data; and an output device configured to output the information for localization and the information for driving path.

20 Claims, 16 Drawing Sheets

(51) Int. Cl.
    *G01S 13/86* (2006.01)
    *G01S 13/89* (2006.01)
    *G01S 13/931* (2020.01)
    *G01S 17/89* (2020.01)
    *G01S 17/931* (2020.01)

(52) U.S. Cl.
    CPC ............ *G01S 13/867* (2013.01); *G01S 13/89* (2013.01); *G01S 13/931* (2013.01); *G01S 17/89* (2013.01); *G01S 17/931* (2020.01); *B60W 2420/403* (2013.01); *B60W 2420/408* (2024.01)

(58) Field of Classification Search
    CPC ................. B60W 40/02; B60W 40/10; B60W 2050/0005; B60W 2050/0052; B60W 2420/403; B60W 2420/408; B60W 2554/20; H04N 7/18
    See application file for complete search history.

(56) References Cited

U.S. PATENT DOCUMENTS

2020/0118285 A1    4/2020  Metzner et al.
    2020/0355820 A1*  11/2020  Zeng ..................... G01S 13/865
    2021/0165093 A1*   6/2021  Komorkiewicz ...... G06V 10/80
    2021/0405638 A1*  12/2021  Boyraz ................. G06V 20/64
    2022/0214444 A1*   7/2022  Das ......................... G01S 17/50
    2022/0277557 A1*   9/2022  Wei ........................ G06V 10/82
    2022/0390588 A1*  12/2022  Bravo Orellana .... G01S 13/931
    2022/0398851 A1*  12/2022  Nehmadi ............. G01S 17/931
    2023/0048926 A1*   2/2023  Kurbiel ............. G01C 21/3691
    2024/0118419 A1*   4/2024  Yao .......................... G06T 7/74

FOREIGN PATENT DOCUMENTS

KR      10-2017-0069719 A      6/2017
    KR      10-2017-0118501 A      10/2017
    KR         10-2083482 B1        3/2020
    KR      10-2021-0050925 A       5/2021
    KR           102346304 B1 *     1/2022

OTHER PUBLICATIONS

Wang et al.; Multi-Sensor Fusion in Automated Driving: A Survey; IEEE Access—Digital Object Identifier 10.1109/ACCESS.2019.2962554; date of current version Jan. 6, 2020; vol. 8, 2020; pp. 2847-2868 (Year: 2020).*

* cited by examiner

VEHICLE DRIVING CONTROL SYSTEM AND METHOD USING SENSOR FUSION TECHNOLOGY

CROSS-REFERENCE TO RELATED APPLICATION

The present application claims priority to Korean Patent Application No. 10-2022-0018012, filed on Feb. 11, 2022, the entire contents of which is incorporated herein for all purposes by this reference.

BACKGROUND OF THE PRESENT DISCLOSURE

Field of the Present Disclosure

The present disclosure relates to a vehicle driving control system and a method for the same by use of sensor fusion technology.

Discussion of Related Art

With the technology of Advanced Driver Assistance System (ADAS) and Automated Driving System highly advanced, accuracy of the detection of surroundings of the vehicle gets more and more important.

For example, road boundaries are needed to be accurately detected to generate a driving path and enhance the driving safety, and so requirement for the accurate detection by use of a detection sensor(s) is significantly increased.

Camera, radar, LiDAR, etc. are used as detection sensors for the surroundings of a vehicle, in which their capabilities and accuracies of detection are different from one another.

Among them, the camera is good at classification of objects such as a car, a commercial vehicle (truck, bus, etc.), a two-wheeled vehicle, a pedestrian, a bicycle, etc. but its degree of precision for object detection is not good enough.

In case of the radar, its detection of a speed of an object is good, but its ability of classification is limited to whether the object is moving or stationary.

Also, the LiDAR is very good at detection of the shape and the distance to an object, but its ability of classification is poor too.

FIG. 1A and FIG. 1B represent examples of detecting results by use of such detection sensors.

FIG. 1A shows a front view from the host vehicle, and FIG. 1B represents the detecting results in bird eye's view by use of camera, radar, and LiDAR sensors for detecting a same front situation.

As shown in FIG. 1A, leading vehicles are running in the respective front lanes, and there are a guard rail as the left road boundary and a sound barrier wall as the right boundary.

It is understood, as shown in FIG. 1B as the detecting results, that the vehicles and the road boundaries were well recognized distinctly by the camera sensor but each detected location was less accurate compared to other types of sensors.

Also, in case of the radar sensor, the vehicles and the guard rail were detected but not well distinctly recognized. In other words, radar has a problem that it is not able to recognize a road boundary distinctly from other object not a road boundary.

By the LiDAR sensor were the vehicles well detected and the guard rail and the sound barrier wall well too. However, it may cause an erred result that trees and bushes are detected as part of a road boundary and also, LiDAR often fails to distinguish a bus from a road boundary.

Accordingly, creation of a driving path and enhancement of the driving safety cannot be achieved with satisfactory levels by use of camera, radar, and LiDAR separately, and a new detection method other than such conventional ways is desired.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to enhancing the detecting performance for surroundings of a host vehicle by use of sensor fusion technology.

Various aspects of at least an exemplary embodiment are directed to enhancing the detecting performance for road boundaries.

On the other hand, when localizing the host vehicle and generating a driving path by use of a detection result of road boundaries, various aspects of at least an exemplary embodiment are directed to increasing accuracy of detection for the localization and satisfying a recognition rate required for the creation of the driving path by separating the detection for the localization from the one for the creation of the driving path.

A vehicle driving control system, according to an exemplary embodiment of the present disclosure, includes: an input device configured to receive LiDAR data and camera and/or radar data obtained for a region of interest around a host vehicle; a microprocessor configured to obtain information for localization on objects of interest by executing a first process for the LiDAR data and the camera and/or radar data and obtain information for driving path on the objects by executing a second process for the LiDAR data and the camera and/or radar data; and an output device configured to output the information for localization and the information for driving path.

In at least an exemplary embodiment of the present disclosure, the objects of interest include a road boundary.

In at least an exemplary embodiment of the present disclosure, the first process includes obtaining the information for localization according to a result of assessing the LiDAR data by use of the camera and/or radar data.

In at least an exemplary embodiment of the present disclosure, the first process includes performing the assessing by use of grid mapping information of the camera and/or radar data.

In at least an exemplary embodiment of the present disclosure, the grid mapping information includes: first grid map information obtained by mapping the camera data to a grid map; and second grid map information obtained by mapping the radar data to the grid map.

In at least an exemplary embodiment of the present disclosure, the first grid map information includes a first score determined for each cell according to classification information on the objects obtained by use of the camera data, and the second grid map information includes a second score determined for each cell according to mobility information on the objects obtained by use of the radar data.

In at least an exemplary embodiment of the present disclosure, the information for localization is obtained from the LiDAR data associated with cells of which the first score and/or the second score is equal to or over a predetermined threshold.

In at least an exemplary embodiment of the present disclosure, the first grid map information and the second grid map information are obtained by accumulating a plurality of data frames.

In at least an exemplary embodiment of the present disclosure, the second process includes obtaining the information for driving path by use of the LiDAR data associated with the information for localization.

In at least an exemplary embodiment of the present disclosure, the second process includes dividing the region of interest into a plurality of sections, and using fusion free space in which the LiDAR data and the camera and/or radar data are fused to be expressed as a point for each section.

In at least an exemplary embodiment of the present disclosure, the second process includes using Kaman Filter or Weighted Sum as a tracking algorithm.

A driving control method, according to an exemplary embodiment of the present disclosure, includes: receiving LiDAR data and camera and/or radar data obtained for a region of interest around a host vehicle; obtaining information for localization on objects of interest by executing a first process for the LiDAR data and the camera and/or radar data; and obtaining information for driving path on the objects by executing a second process for the LiDAR data and the camera and/or radar data.

In at least an exemplary embodiment of the present disclosure, the first process includes determining the information for localization according to a result of assessing the LiDAR data by use of the camera and/or radar data.

In at least an exemplary embodiment of the present disclosure, the first process includes performing the assessing by use of grid mapping information of the camera and/or radar data.

In at least an exemplary embodiment of the present disclosure, the grid mapping information includes: first grid map information obtained by mapping the camera data to a grid map; and second grid map information obtained by mapping the radar data to the grid map.

In at least an exemplary embodiment of the present disclosure, the first grid map information includes a first score determined for each cell according to classification information on the objects obtained by use of the camera data, and the second grid map information includes a second score determined for each cell according to mobility information on the objects obtained by use of the radar data.

In at least an exemplary embodiment of the present disclosure, the information for localization is obtained from the LiDAR data associated with cells of which the first score and/or the second score is equal to or over a predetermined threshold.

In at least an exemplary embodiment of the present disclosure, the first grid map information and the second grid map information are obtained by accumulating a plurality of data frames.

In at least an exemplary embodiment of the present disclosure, the second process includes determining the information for driving path by use of the LiDAR data associated with the information for localization.

In at least an exemplary embodiment of the present disclosure, the second process includes dividing the region of interest into a plurality of sections, and using fusion free space in which the LiDAR data and the camera and/or radar data are fused to be expressed as a point for each section.

According to at least an exemplary embodiment of the present disclosure, the detection performance for surroundings of a host vehicle may be enhanced.

Also, according to at least an exemplary embodiment of the present disclosure, the detection performance for road boundaries may be enhanced.

Also, according to at least an exemplary embodiment of the present disclosure, when localizing the host vehicle and generating a driving path by use of a detection result of road boundaries, accuracy of detection for the localization may be increased and a recognition rate required for the creation of the driving path may be satisfied by separating the detection for the localization from the one for the creation of the driving path.

In particular, not only can a requirement of the localization for detection of road boundaries be satisfied, but the recognition rate of road boundaries can also be enhanced and redundancy for recognition may be secured due to various sensor data being used in combination, by providing to a localization module LiDAR data which is the most accurate for detecting locations without variation because its classification performance is complemented with camera and radar data.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
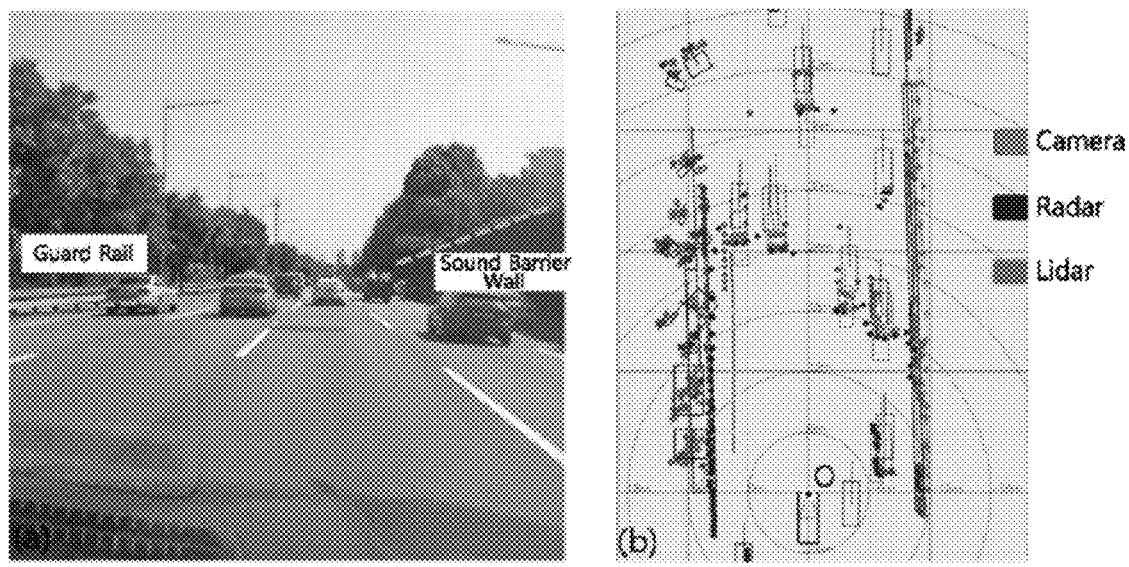
FIG. 1A shows a front view from a host vehicle.
FIG. 1B represents detecting results in bird eye's view by use of camera, radar, and LiDAR sensors for the same.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In case where identical elements are included in various exemplary embodiments of the present disclosure, they will be provided the same reference numerals, and redundant description thereof will be omitted. In the following description, the terms "module" and "unit" for referring to elements are assigned and used interchangeably in consideration of convenience of explanation, and thus, the terms per se do not necessarily have different meanings or functions.

Furthermore, in describing the exemplary embodiments of the present disclosure, when it is determined that a detailed description of related publicly known technology may obscure the gist of the exemplary embodiments of the present disclosure, the detailed description thereof will be omitted. The accompanying drawings are used to help easily explain various technical features and it should be understood that the exemplary embodiments presented herein are not limited by the accompanying drawings. Accordingly, the present disclosure should be construed to extend to any alterations, equivalents and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein have the same meanings as those commonly understood by one of ordinary skill in the art to which the present disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Furthermore, the term "unit" or "control unit", for example, included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Figure 2:
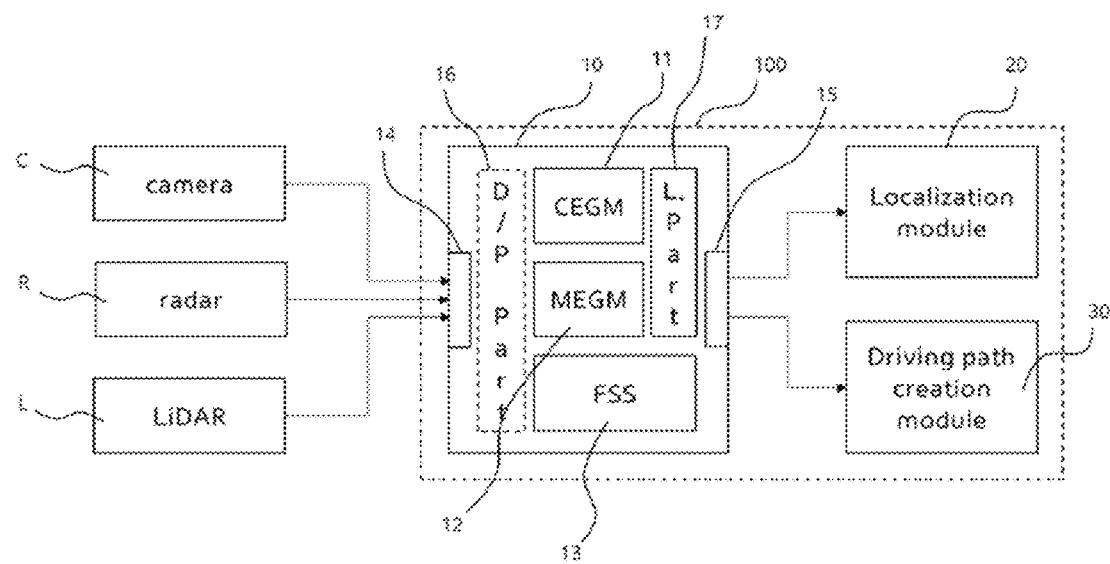
FIG. 2 represents a schematic diagram of an exemplary embodiment of a vehicle driving control system.
Figure 3:
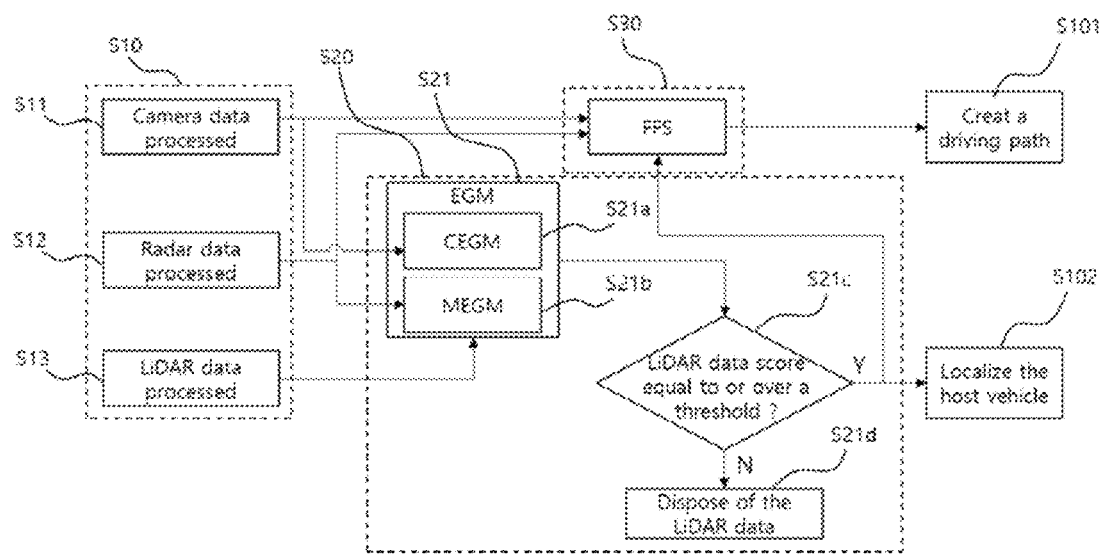
FIG. 3 represents a flowchart of an exemplary embodied process of detecting objects.

FIG. 2 and FIG. 3 represent a schematic diagram of an exemplary embodiment of a vehicle driving control system 100 and a flowchart of a process for detecting objects.

The driving control system 100 of the present disclosure includes an object detection module 10, a localization module 20, and a driving path creation module 30.

The object detection module 10 includes an input device 14, an output device 15, a class evidential grid mapping portion (referred to as 'first mapping portion' herein after) 11, a moving evidential grid mapping portion (referred to as 'second mapping portion' herein after) 12, and a fusion free space portion 13.

The input device 14 receives each data from camera C, radar R and LiDAR L, and for example, may include an input port to which a signal cable(s) may be connected for receiving the data from the camera C, the radar R and the LiDAR L.

In FIG. 2, the data processing portion 16 outputs information on objects by processing the data received through the input device 14 in Steps 10 to 13. The data processing portion 16 is not necessarily included in the object detection module 10, but the data may be each processed in each sensor itself, the camera C, the radar R and the LiDAR L (in a microprocessor in each sensor). That is, the data processing portion 16 may be included in or otherwise separately provided from the object detection module 10.

The data obtained through the camera C is processed in a predetermined manner in the data processing portion 16 and output as valid data for the corresponding object(s) in Step 11.

The camera data output from the data processing portion 16 may include detection data of, for example, ambient vehicles, road boundary(s) such as a guard rail or a sound barrier wall, road lines, two-wheeled vehicles, pedestrians, etc. The camera data may include classification information, location information, etc. on each object.

Figure 4A:
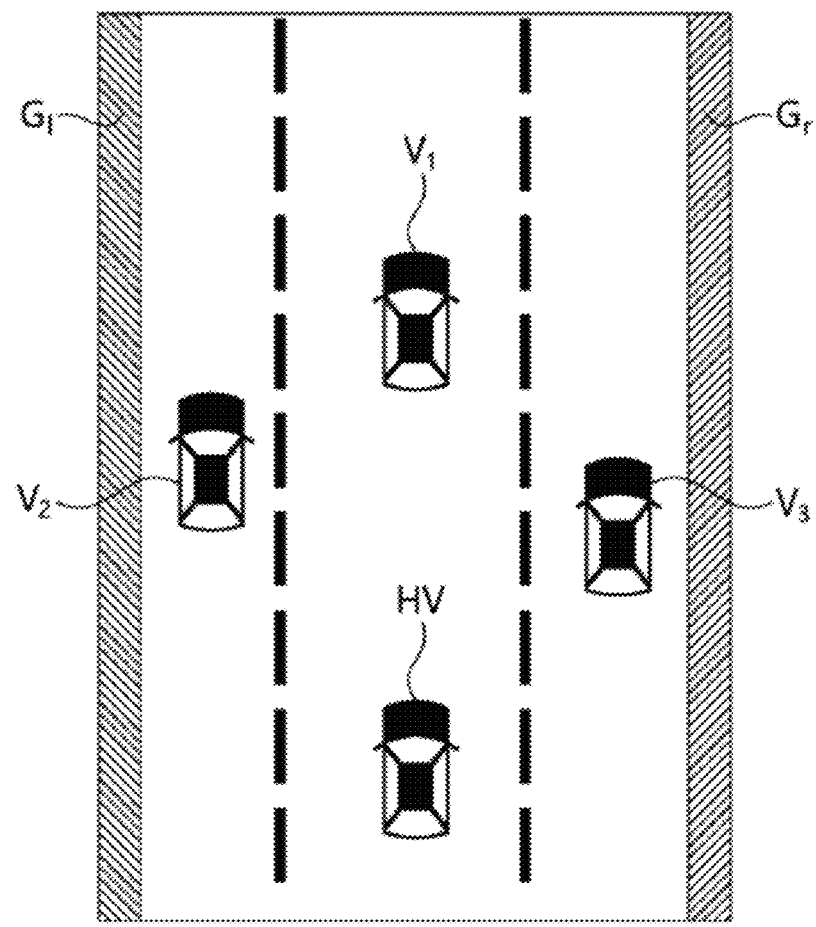
FIG. 4A represents an assumed example situation for a surrounding environment of a running host vehicle HV.
Figure 4B:
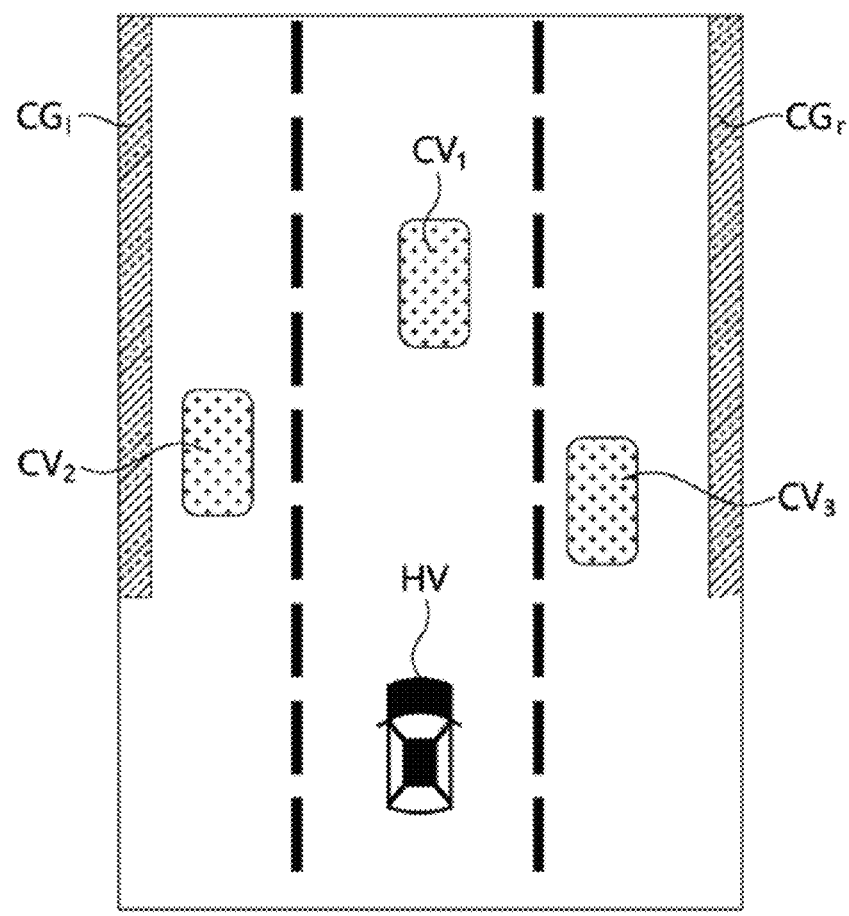
FIG. 4B represents an example of a detection result for the environment of FIG. 4A by use of camera.

FIG. 4B represents an example of camera data for the environment of FIG. 4A, which will be detailed below.

At first, FIG. 4A represents an assumed example situation for a surrounding environment of a running host vehicle, in which there are a guard rail or a sound barrier wall as the road boundaries Gl and Gr to the right and left of the host vehicle HV, a first vehicle $V_1$ in the same lane that the host vehicle HV is running in, a second vehicle $V_2$ in the left lane, and a third vehicle $V_3$ in the right lane as other vehicles leading in front.

In FIG. 4A, the object detection data obtained through the camera C and data-processed, for example as shown in FIG. 4B, include left road boundary data $CG_l$, right road boundary data $CG_r$, first-vehicle data $CV_1$, second-vehicle data $CV_2$, and third-vehicle data $CV_3$ running in the three lanes in front. Because what a detected object may be determined by use of camera, camera data of each object may include classification information on the object.

On the other hand, the data obtained through the radar R may be output as valid data for the objects after data-processed in a predetermined manner in the data processing portion 16 in Step 12, and include detection data for a moving object and a stationary object. The radar data may include information on its location and information for the determination of whether it is moving or stationary (e.g., on velocity) of each object.

Figure 5A:
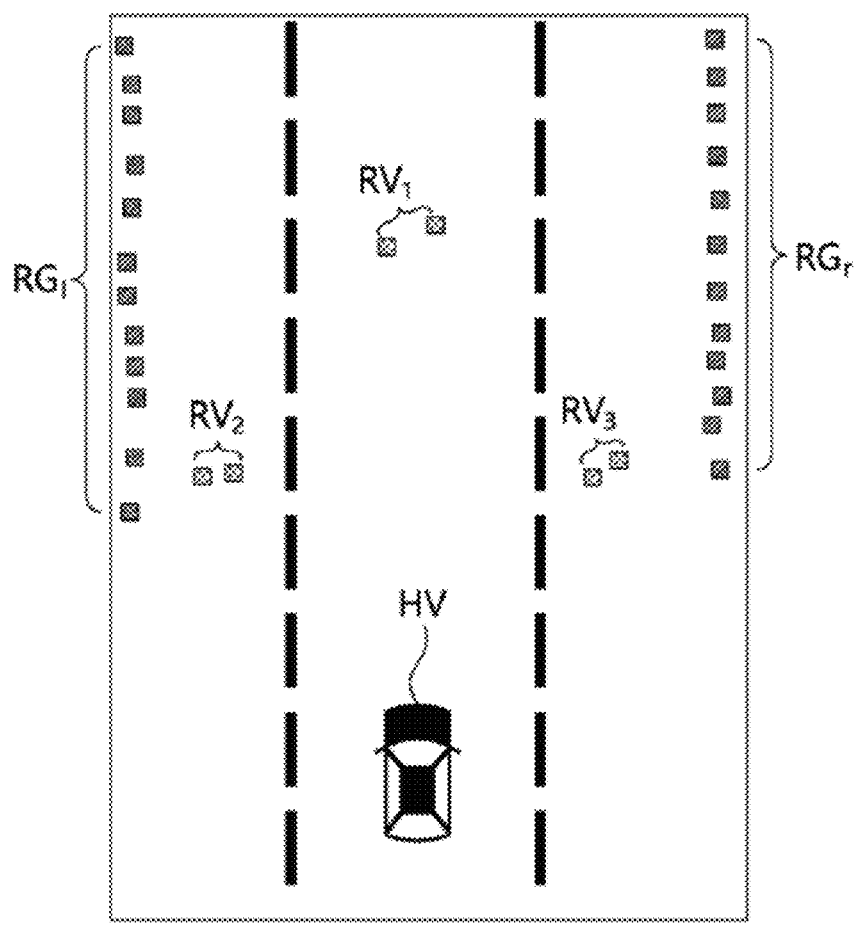
FIG. 5A represents an example of a detection result for the environment of FIG. 4A by use of radar.

For example, FIG. 5A represents radar detection data of the environment of FIG. 4A, and the radar data, as shown in FIG. 5A, include radar data $RG_l$ for the left road boundary detected as stationary, radar data $RV_1$, $RV_2$, and $RV_3$ for the three vehicles detected as moving, and radar data $RG_r$ for the right road boundary detected as stationary.

Also, the data obtained through the LiDAR L may be output as valid data for the objects after data-processed in a predetermined manner in the data processing portion 16 in Step 13, and include information on at least its location of each detected object.

Figure 6A:
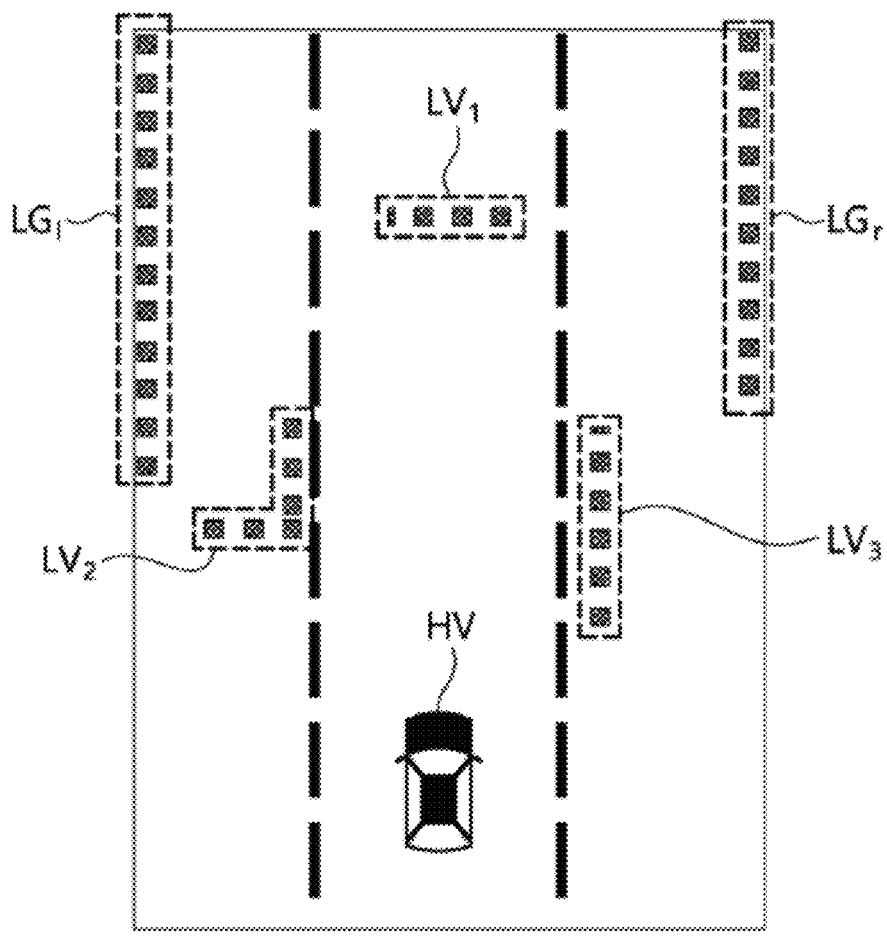
FIG. 6A represents an example of a detection result for the environment of FIG. 4A by use of LiDAR.

FIG. 6A represents an example of LiDAR detection data of the environment of FIG. 4A, and the LiDAR data, as shown in FIG. 6A, include LiDAR data $LG_l$ for the left road boundary, LiDAR data $LRV_1$, $LV_2$, and $LV_3$ for the three vehicles, and LiDAR data $LG_r$ for the right road boundary.

The camera, radar, and LiDAR data output from the data processing portion 16 get through grid mapping process in Step 21, a score(s) for the LiDAR data is determined through of an assessment(s), and LiDAR data with a score over a predetermined threshold are finally output in Step 20 (first process).

To the present end, the camera data are input to the first mapping portion 11 and form a class evidential grid map after mapped onto a grid map.

Figure 4C:
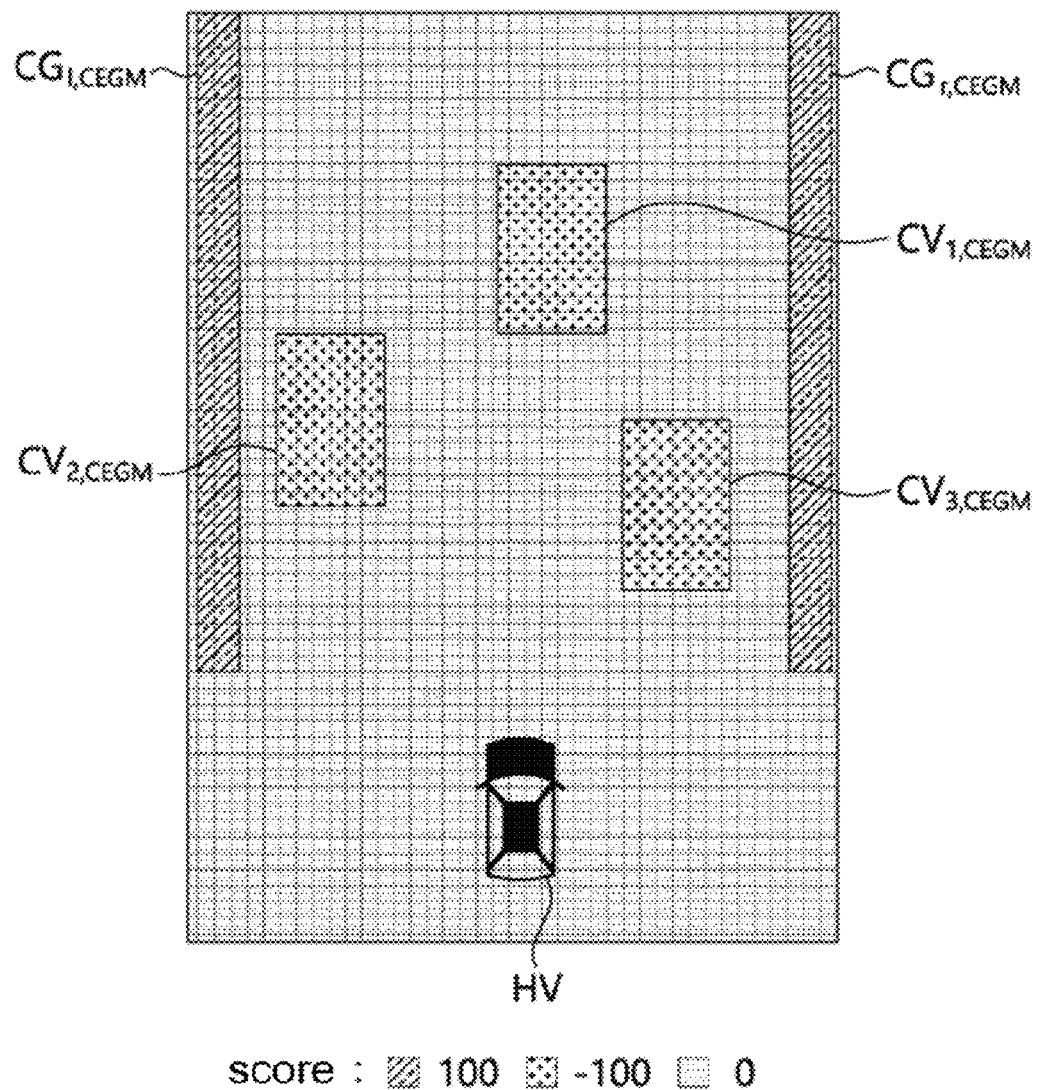
FIG. 4C represents an example of a Class Evidential Grid Map (CEGM) which is obtained by mapping the camera detection result of FIG. 4A to a grid.

For example, FIG. 4C represents a class evidential grid map which is obtained by use of the camera data of FIG. 4C.

In FIG. 4C, the grid is divided by a plurality of square cells horizontally and vertically for a region of interest around the host vehicle HV, and a score is determined for each cell according to its associated camera data therein. For example, the score of each cell may be set to be determined in the range of −100 to 100 according to the classification of the associated camera data therein, and it may be determined that the closer to 100 the score is, the higher chance it is that the associated data of the corresponding cell is for road boundary, and the closer to −100, the higher chance the associated data of the corresponding cell being for other object not road boundary.

For example, as shown in FIG. 4C, it may be determined that the cells $CG_{l,CEGM}$ and $CG_{r,CEGM}$ which the camera data corresponding to the road boundary occupy have scores of 100, the cells $CV_{1,CEGM}$, $CV_{2,CEGM}$, and $CV_{3,CEGM}$ which the camera data for the front leading three vehicles occupy have scores of −100, and the other cells have scores of 0 (zero).

Figure 4D:
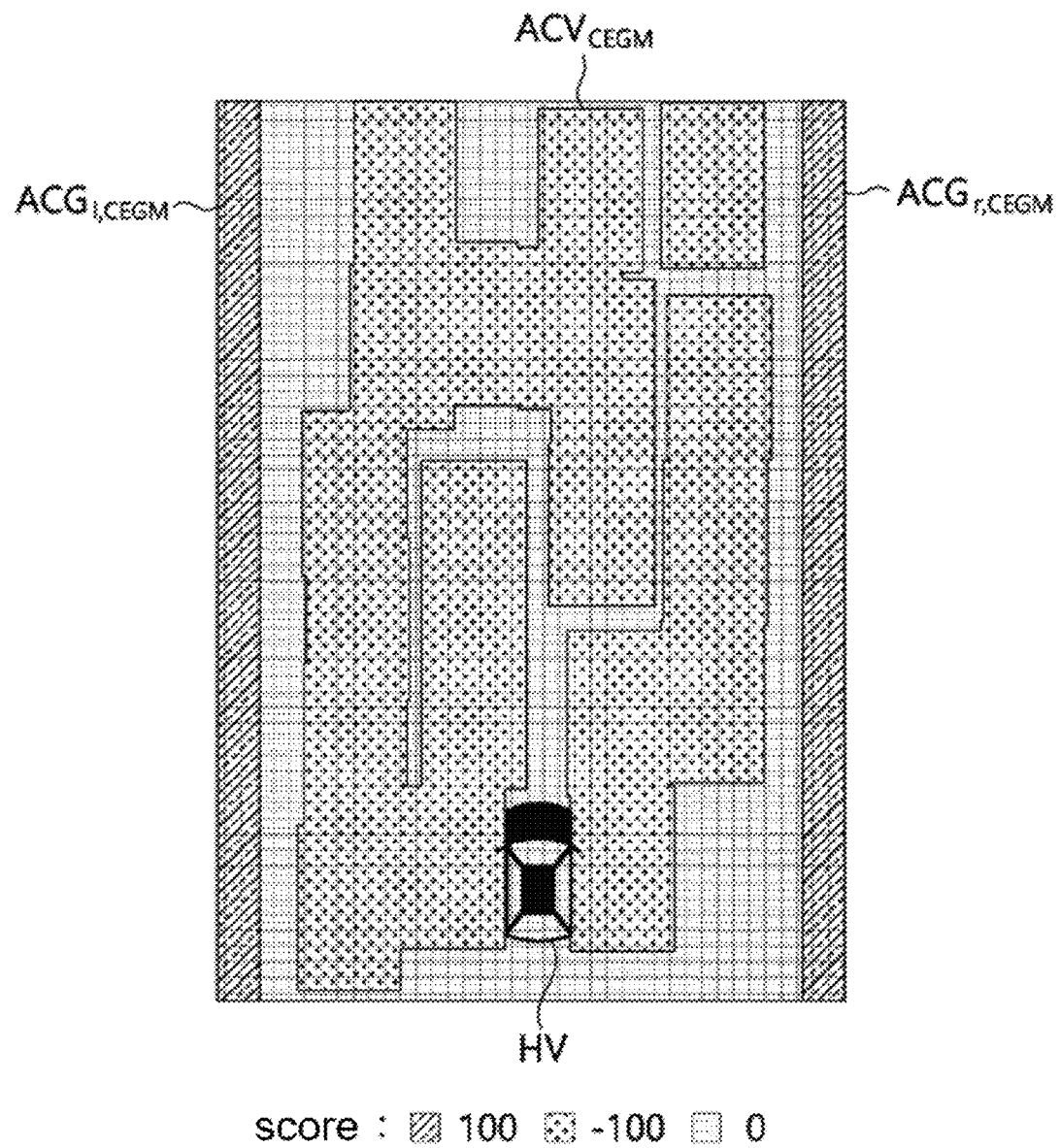
FIG. 4D represents a result of accumulating such grid map of FIG. 4C for a plurality of time frames.

The kinds of grid maps may be accumulated by time to form an accumulated grid map like FIG. 4D.

For example, an accumulated class evidential grid map like FIG. 4D may be formed by accumulating all the grid maps for camera data of a plurality of consecutive imaging frames, each grid map formed by use of each frame camera data like FIG. 4C.

The cells $ACV_{CEGM}$ including scores of −100 correspond to the cells which a vehicle occupies in at least one frame camera data, and the space which road boundaries cannot occupy may be determined more clearly with such accumulation. Also, the data corresponding to road boundaries, as accumulated, make the locations of the cells $ACG_{l,CEGM}$ and $ACG_{r,CEGM}$ corresponding to road boundaries more clearly distinguished in the grid map.

The class evidential grid map may be used for classifying road boundary data in the LiDAR data as described below.

Figure 5B:
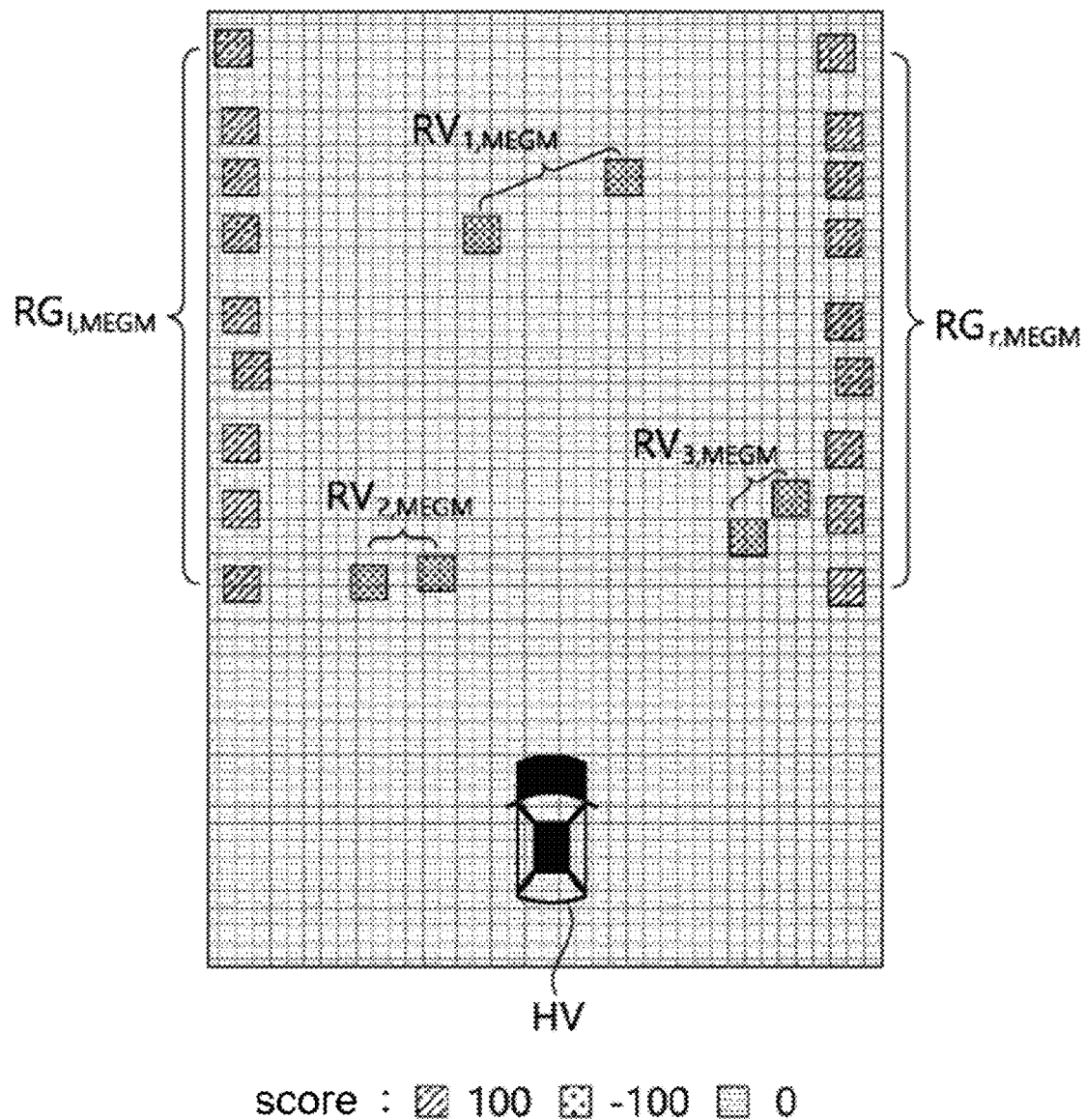
FIG. 5B represents an example of a Moving Evidential Grid Map (MEGM) which is obtained by mapping the radar detection result of FIG. 5A to a grid.

On the other hand, the radar data are input to the second mapping portion 12 and mapped on the grid map to form a moving evidential grid map, detailed via FIG. 5B.

At first, FIG. 5B represents a moving evidential grid map which is obtained by use of the radar data of FIG. 5A.

In FIG. 5B, the grid is divided by a plurality of square cells horizontally and vertically for a region of interest around the host vehicle HV, and a score is determined for each cell according to its associated radar data therein. For example, the score of the cells $RV_{1,MEGM}$, $RV_{2,MEGM}$, and $RV_{3,MEGM}$ which the radar data of a moving object is input in may be determined as −100, the score of the cells $RG_{l,MEGM}$, and $RG_{r,MEGM}$ which the radar data of a stationary object is input in may be determined as 100, and the other cells without radar data may be determined as 0 (zero).

Figure 5C:
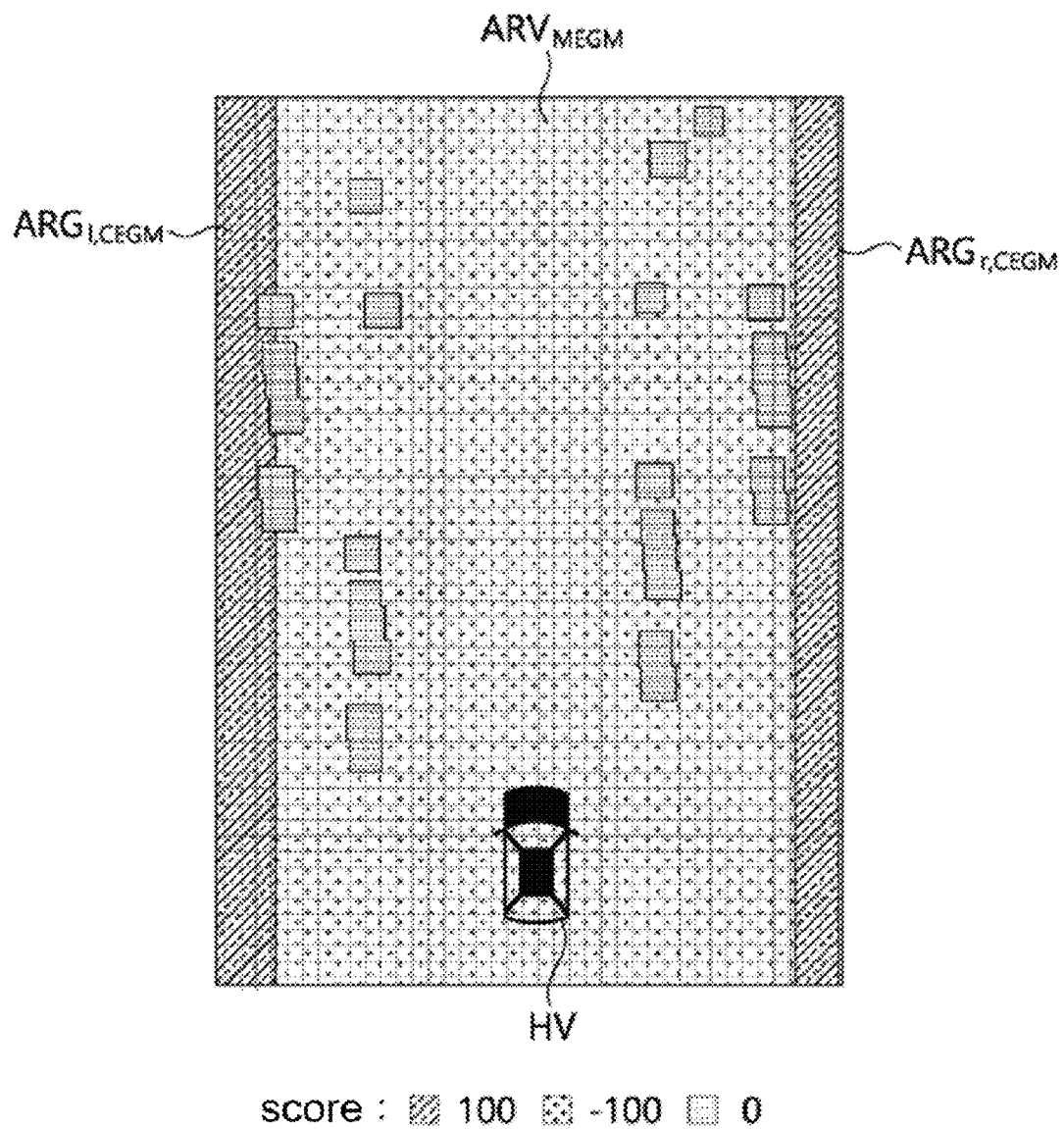
FIG. 5C represents a result of accumulating such grid map of FIG. 5B for a plurality of time frames.

Likewise, the moving evidential grid map too may be accumulated by time and thus form an accumulated moving evidential grid map like FIG. 5C. As shown in FIG. 5C, the cells $ARG_{l,MEGM}$ and $ARG_{r,MEGM}$ of score of 100 which correspond to a stationary object(s) are located accumulatively at the left or right sides, and the cells $ARV_{MEGM}$ of score of −100 which correspond to a moving object(s) are accumulatively located almost entirely on the road.

The moving evidential grid map may be used for determining which data are for a stationary object(s) in the LiDAR data.

Upon the formation of the class and moving evidential grid maps, the LiDAR data are mapped to the grid map and scored to be assessed in a localization portion 17 in Steps 21a and 21b.

Figure 6B:
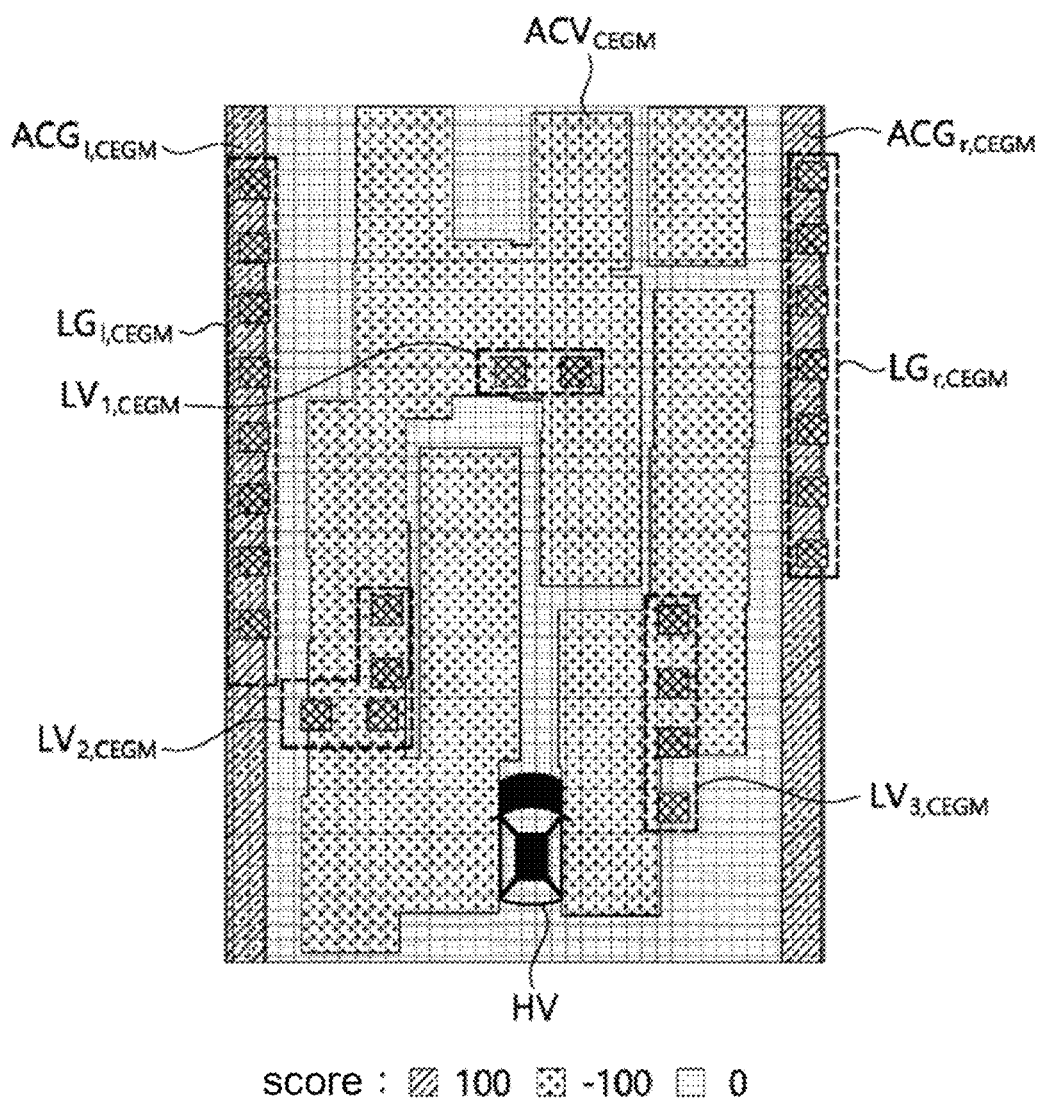
FIG. 6B represents an example of the LiDAR detection result of FIG. 6A mapped to the grid map of FIG. 4D.
Figure 6C:
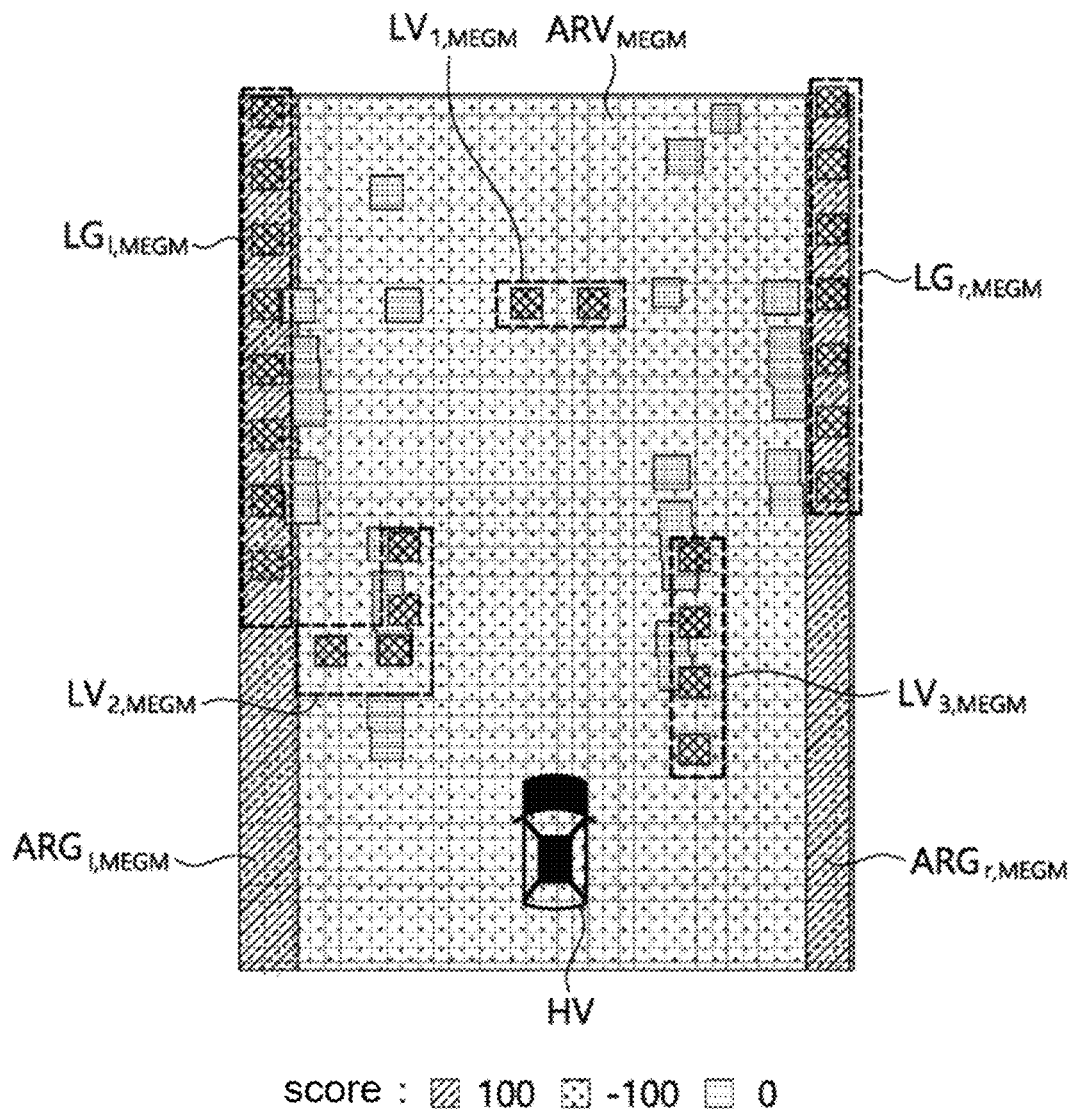
FIG. 6C represents an example of the LiDAR detection result of FIG. 6A mapped to the grid map of FIG. 5C.

FIG. 6B represents the mapped result of the LiDAR data of FIG. 6A to the grid map of FIG. 4B, and FIG. 6C represents the mapped result of the LiDAR data of FIG. 6A to the grid map of FIG. 5C.

The scores for the LiDAR data of FIG. 6A may be determined by such mappings with the scored cells of each grid map.

For example, in FIG. 6B, the LiDAR data of the cells $LG_{l,CEGM}$ and $LG_{r,CEGM}$ for the left and right road boundaries may be scored as 100 for a classification score (referred to as 'first score' herein after) because their corresponding cells have scores of 100 in the class evidential grid map, and likewise the LiDAR data of the cells $LV_{1,CEGM}$, $LV_{2,CEGM}$, and $LV_{3,CEGM}$ for the first, second, and third vehicles V1, V2, and V3 may be scored as −100.

Also, for example, in FIG. 6C, the LiDAR data of the cells $LG_{l,MEGM}$ and $LG_{r,MEGM}$ for the left and right road boundaries may be scored as 100 for a mobility score (referred to as 'second score' herein after) because their corresponding cells have scores of 100 in the moving evidential grid map, and likewise the LiDAR data of the cells $LV_{1,MEGM}$, $LV_{2,MEGM}$, and $LV_{3,MEGM}$ for the first, second, and third vehicles V1, V2, and V3 may be scored as −100.

Upon the determination of the first score and the second score by use of the grid maps, it may be determined in Step 21c whether the scores are equal to or over a predetermined threshold(s), and the LiDAR data including the scores below the predetermined threshold(s) may be disposed of in Step 21d and the LiDAR data including the scores equal to or over the predetermined threshold(s) may be output as the final data corresponding to the road boundaries. When compared to the threshold(s), the sum of the first and second scores may be used, but without being limited thereto. Furthermore, when the final data for the road boundaries being output, the first score is determined first whether it is equal to or over a first threshold and then the final data are output according to whether the so-determined data are equal to or over a second threshold. Of course, the determination by use of the second score may be made first and then the final determination may be made by use of the first score.

Figure 6D:
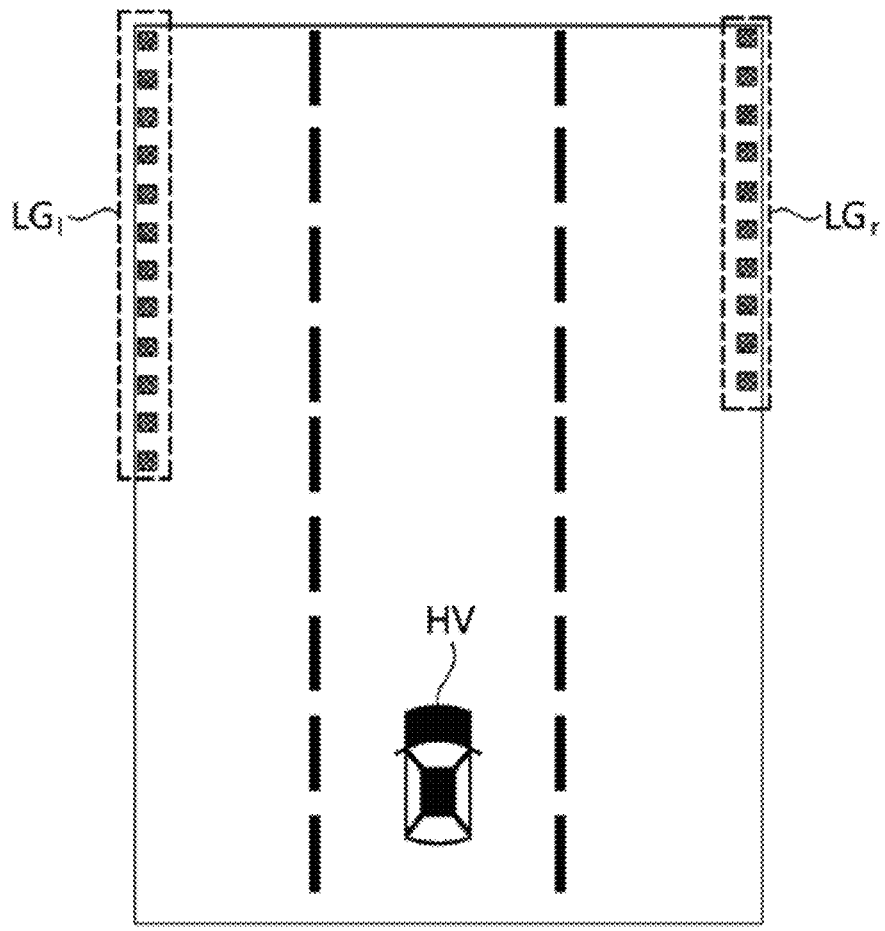
FIG. 6D represents a final output result obtained as information for localization on the road boundaries in the surrounding environment shown in FIG. 4A.

For example, in case where both of the first score based on the class evidential grid map and the second score based on the moving evidential grid score are large, e.g., both scored 100, the corresponding LiDAR data may be determined as road boundaries, as shown in FIG. 6D.

Which data are for the road boundaries is hard to be determined only by use of the LiDAR data of FIG. 6A, but the LiDAR data for the road boundaries may be finally determined by assessing by use of the grid maps formed using the camera and radar data.

Upon the determination of the final LiDAR data for the road boundaries, the location information on the road boundaries may be determined to be transmitted to the localization module 20 via the output device 15 and used for the localization in Step 102. The output device 15, for example, may include an output port to which a signal cable(s) may be connected.

The LiDAR data finally determined as the road boundaries are also transmitted to the fusion free space portion 13 to be used for outputting track data for the road boundaries in Step 30 (second process).

Free space is represented generally by a kind of data form for tracking points which each indicates a current position of in each section, a region of interest divided by a plurality of sections.

Figure 7:
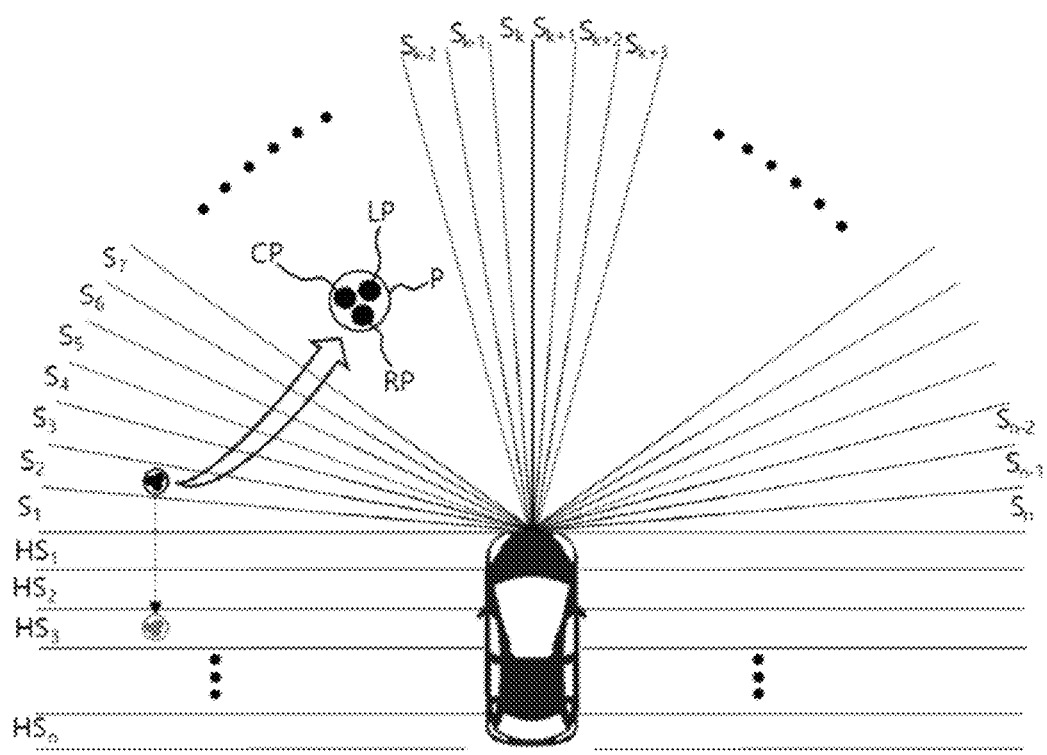
FIG. 7 represents an example of a Fusion Free Space (FFS).

In an exemplary embodiment of the present disclosure, the camera data and the radar data input from the data processing portion 16 and the finally determined LiDAR data for the road boundaries are used such that, for example, as shown in FIG. 7, the camera data, the radar data, and the LiDAR data are registered as respective points in each of the sections S1~Sn and HS1~HSn, and an optimal point P is determined by combining the registered sensor data for each section and tracked.

The sections S1~Sn may be formed by dividing by same angle the front region with radial lines from the origin (e.g., the location of the LiDAR sensor) of the LiDAR data, and for the rear region, horizontal division sections HS1~HSn may be defined. It is obvious that the present disclosure is not limited thereto, and a form of a rectangular grid map may be used instead of the sections of the above shapes.

Also, Kalman Filter or Weighted Sum may be used for the tracking algorithm.

The tracking data for the road boundaries output from the fusion free space portion 13 are transmitted to the driving path creation module 30 via the output device 15 to be used as information for driving path on the road boundaries. The driving path creation module 30 may generate a driving path by use of the information of driving path on the road boundaries in Step 101.

Figure 8:
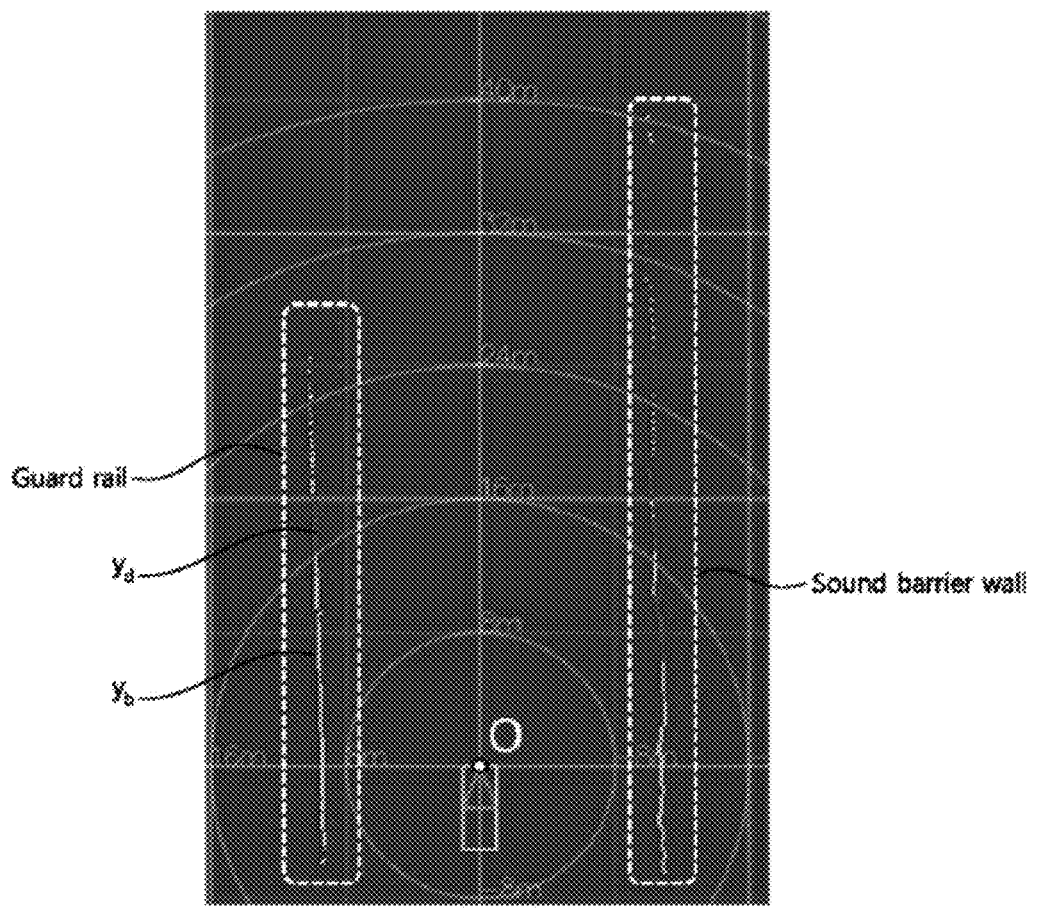
FIG. 8 represents a final output result obtained with the detection result of FIG. 1B as information for driving path for the road boundaries according to an exemplary embodiment of the present disclosure.

FIG. 8 represents, as an example of tracking data for road boundaries output from the fusion free space portion 13, the tracking date for the road boundaries finally determined through the above described process for the detection data of FIG. 1B.

As shown in FIG. 8, according to an exemplary embodiment of the present disclosure, it is well understood that the road boundary data for the left guard rail and the right sound barrier wall with respect to the origin O of the host vehicle are well detected and tracked.

In the road boundary data of FIG. 8, the reliability scores of the brighter points $y_b$ are relatively high but the ones of the dark points $y_d$ are low, and the points $y_b$ of the higher reliability scores are used for outputting the information for driving path.

The reliability score of each point may be determined by combining a reliability score determined in the fusion free space portion 13 itself and a number of tracking of the corresponding section.

The information for driving path on road boundaries output by the combination of the camera, radar, and LiDAR data satisfies well the requirements of the driving path creation module 30 with a wide recognition scope and rate.

On the other hand, in the present disclosure, the data processing portion 16, the first mapping portion 11, the second mapping portion 12, the localization portion 17, and the fusion free space portion 13 may be, for example, provided in the system 100 as programs for each executing the above corresponding description, and executed through an individual or integrated microprocessor.

And, the system 100 may include a memory(s) for storing the programs and the above described threshold values.

Also, in the present disclosure, for the location information on the road boundaries, the class and moving evidential grid maps are used, but the present disclosure is not limited thereto. For example, because the road boundaries may be distinguished only by use of the class evidential grid map, the moving evidential grid map may not be used.

Also, for the tracking data of the road boundaries output in the fusion free space portion 13, the camera and radar data are used together in the present disclosure. However, the present disclosure is not limited thereto and the likely one of the data may be used to be fused with the LiDAR data.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle driving control system controlling vehicle driving by using a driving path generated by sensor fusion technology, the vehicle driving control system comprising:
   a sensor unit including at least one camera, radar sensor, and LiDAR sensor; and
   a controller electrically connected to the sensor unit, wherein the controller is configured to:
      receive LiDAR data and camera and/or radar data obtained for a region of interest around a host vehicle;
      obtain information for localization on objects of interest by executing a first process for the LiDAR data and the camera and/or radar data; and
      output the information for localization,
      wherein the first process includes:
         determining a score according to classification information of the camera data or mobility information of the radar data, and obtaining information for localization on the objects of interest based on the score.

2. The vehicle driving control system of claim 1, wherein the objects of interest include a road boundary.

3. The vehicle driving control system of claim 1, wherein the first process includes obtaining the information for localization according to a result of assessing the LiDAR data by use of the camera and/or radar data.

4. The vehicle driving control system of claim 3, wherein the first process further includes performing the assessing by use of grid mapping information of the camera and/or radar data.

5. The vehicle driving control system of claim 4, wherein the grid mapping information includes:
   first grid map information obtained by mapping the camera data to a grid map; and
   second grid map information obtained by mapping the radar data to the grid map.

6. The vehicle driving control system of claim 5,
   wherein the first grid map information includes a first score determined for each cell according to classification information on the objects obtained by use of the camera data, and
      wherein the second grid map information includes a second score determined for each cell according to mobility information on the objects obtained by use of the radar data.

7. The vehicle driving control system of claim 6, wherein the information for localization is obtained from the LiDAR data associated with cells of which the first score and/or the second score is equal to or over a predetermined threshold.

8. The vehicle driving control system of claim 6, wherein the first grid map information and the second grid map information are obtained by accumulating a plurality of data frames.

9. The vehicle driving control system of claim 1,
   wherein the controller is further configured to:
      obtain information for driving path on the objects by executing a second process for the LiDAR data and the camera and/or radar data; and
      output the information for driving path, and
      wherein the second process includes obtaining the information for driving path by use of the LiDAR data associated with the information for localization.

10. The vehicle driving control system of claim 9, wherein the second process further includes dividing the region of interest into a plurality of sections, and using a fusion free space in which the LiDAR data and the camera and/or radar data are fused to be expressed as a point for each section.

11. The vehicle driving control system of claim 10, wherein the second process further includes using Kaman Filter or Weighted Sum as a tracking algorithm.

12. A driving control method for controlling vehicle driving by using a driving path generated by sensor fusion technology, the driving control method comprises:
   receiving, by a controller, LiDAR data and camera and/or radar data obtained for a region of interest around a host vehicle; and
   obtaining, by the controller, information for localization on objects of interest by executing a first process for the LiDAR data and the camera and/or radar data; and
   wherein the first process includes:
      determining a score according to classification information of the camera data or mobility information of the radar data, and
      obtaining information for localization on the objects of interest based on the score.

13. The driving control method of claim 12, wherein the first process includes determining the information for localization according to a result of assessing the LiDAR data by use of the camera and/or radar data.

14. The driving control method of claim 13, wherein the first process further includes performing the assessing by use of grid mapping information of the camera and/or radar data.

15. The driving control method of claim 14, wherein the grid mapping information includes:
   first grid map information obtained by mapping the camera data to a grid map; and
   second grid map information obtained by mapping the radar data to the grid map.

16. The driving control method of claim 15,
   wherein the first grid map information includes a first score determined for each cell according to classification information on the objects obtained by use of the camera data, and
   wherein the second grid map information includes a second score determined for each cell according to mobility information on the objects obtained by use of the radar data.

17. The driving control method of claim 16, wherein the information for localization is obtained from the LiDAR data associated with cells of which the first score and/or the second score is equal to or over a predetermined threshold.

18. The driving control method of claim 16, wherein the first grid map information and the second grid map information are obtained by accumulating a plurality of data frames.

19. The driving control method of claim 12,
wherein the driving control method further includes:
- obtaining, by the controller, information for driving path on the objects by executing a second process for the LiDAR data and the camera and/or radar data; and
- outputting, by the controller, the information for driving path, and wherein the second process includes determining the information for driving path by use of the LiDAR data associated with the information for localization.

20. The driving control method of claim 19, wherein the second process includes dividing the region of interest into a plurality of sections, and using a fusion free space in which the LiDAR data and the camera and/or radar data are fused to be expressed as a point for each section.

\* \* \* \* \*